United States Patent [19]

Zhao et al.

[11] Patent Number: 5,621,157
[45] Date of Patent: Apr. 15, 1997

[54] METHOD AND CIRCUITRY FOR CALIBRATING A MICROMACHINED SENSOR

[75] Inventors: Yang Zhao, North Andover; Richard S. Payne, Andover, both of Mass.

[73] Assignee: Analog Devices, Inc., Norwood, Mass.

[21] Appl. No.: 480,330

[22] Filed: Jun. 7, 1995

[51] Int. Cl.$^6$ ................................................. G01L 1/14
[52] U.S. Cl. ................................................................ 73/1.38
[58] Field of Search .......................... 73/1 D, 2, 514.01, 73/514.29, 514.32; 361/283.2

[56] References Cited

U.S. PATENT DOCUMENTS

| | | | |
|---|---|---|---|
| 5,253,510 | 10/1993 | Allen et al. | 73/1 D |
| 5,287,724 | 2/1994 | White et al. | 73/1 D |
| 5,314,572 | 5/1994 | Core et al. | 156/643 |
| 5,345,824 | 9/1994 | Sherman et al. | 73/517 B |
| 5,347,841 | 9/1994 | Enzinna | 73/1 D |
| 5,391,283 | 2/1995 | Shimada et al. | 73/1 D |

*Primary Examiner*—Robert Raevis
*Attorney, Agent, or Firm*—Hale and Dorr

[57] ABSTRACT

To calibrate an accelerometer having a ground plane, two fixed beams, and a movable beam centered between the fixed beams, a force/acceleration reference is produced by providing a change in voltage on the ground plane. Circuit gain is adjusted so that the output response indicates the force reference. The calibration method can be used to self-calibrate in response to an event, such as a power-up state. The calibration can be performed without shaking and can be used with either open or closed loop circuits.

19 Claims, 1 Drawing Sheet

METHOD AND CIRCUITRY FOR CALIBRATING A MICROMACHINED SENSOR

FIELD OF THE INVENTION

This invention relates to calibrating micromachined sensors.

BACKGROUND OF THE INVENTION

Due to variations in manufacturing, a micromachined sensor needs to be calibrated with a known reference in order to work properly. For an accelerometer, it would be desirable to provide a known force/acceleration reference that is independent of manufacturing variations, and to calibrate the accelerometer by adjusting circuit gain so that an output signal indicates the force reference (force and acceleration are used here interchangeably because they differ only by a mass). Such circuit gain adjustment is typically done either by trimming a resistor with a laser, or by programming an on-chip EPROM.

As a practical matter, it is difficult to provide a force/acceleration reference. One acceleration reference that can be used is gravity. However, gravity has only one value and operates in only one direction. Using gravity as a reference would require rotating a wafer of sensors to different positions, thus necessitating new and complicated calibrating equipment.

Another method for providing a force reference is to shake the wafer or packaged sensor. Shaking a wafer is difficult in practice, however, because it too would require new equipment that would shake both the wafer and other calibrating equipment together. Calibration has been performed by shaking a packaged sensor and programming an EPROM formed on the die. This method requires extra fabrication to produce the EPROM, which then takes up space on the die; moreover, this method takes significant time to calibrate because each device must be shaken individually.

Due to these drawbacks, it is desirable to provide an improved method to calibrate a micromachined sensor to a known force/acceleration reference without shaking or rotating the wafer or packaged sensor.

SUMMARY OF THE INVENTION

The method and apparatus of the present invention overcome the difficulties of providing a force/acceleration reference. The method and apparatus are preferably implemented with a sensor that has a movable beam positioned laterally between two beams that are fixed relative to the ground plane. The beams are suspended vertically over a ground plane, so that the movable beam moves laterally in response to an acceleration of the sensor. The movable beam and the two fixed beams form a differential capacitor. A circuit senses the capacitance and provides a signal that represents force/acceleration.

In such a sensor, a signal that is produced is affected by certain process variations, the most significant of which is the beam gap, i.e., the distance between the movable beam and the fixed beams. When a voltage is provided to the movable beam, the force that is produced is highly dependent on this beam gap.

It has been found that by varying the voltage on the ground plane while keeping the voltage on the movable beam fixed, not only is a vertical force produced between the beams and the ground plane, but also a lateral force that acts on the movable beam is produced. It has further been found that this lateral force is (1) insensitive to the beam gap; (2) linear with respect to the ground plane voltage; and (3) independent of the voltage on the movable beam. Because this lateral force is independent of the beam gap, it can be used as a force reference.

In the calibration method of the present invention, a change in the voltage on the ground plane produces a change in the lateral force on the movable beam. A circuit that senses this force has a circuit gain. This gain is calibrated so that the change in the output signal indicates the change in the lateral force.

This calibration method can be used to automatically self-calibrate the sensor in response to a triggering event, such as power-up or the lapse of time. Such self-calibration compensates for changes over time in mechanical properties of the movable beam and for variations in temperature that can affect the sensitivity of the sensor. The self-calibration also serves as a self-test.

The method and apparatus of the present invention provide a force/acceleration reference that is independent of certain processing variations, and that can be use with both open and closed loop sensor circuitry. With this method, new calibrating equipment is not required, there is no need to shake a wafer or a packaged sensor, and it is not necessary to take up space on the sensor die with an EPROM or other significant dedicated calibrating circuitry. With a self-calibrating sensor, the accuracy of the sensor is improved, and the time and cost of calibration may be reduced or eliminated. Other features and advantages will become apparent from the following detailed description when read in conjunction with the drawings, and from the appended claims.

DETAILED DESCRIPTION

Figure 1:
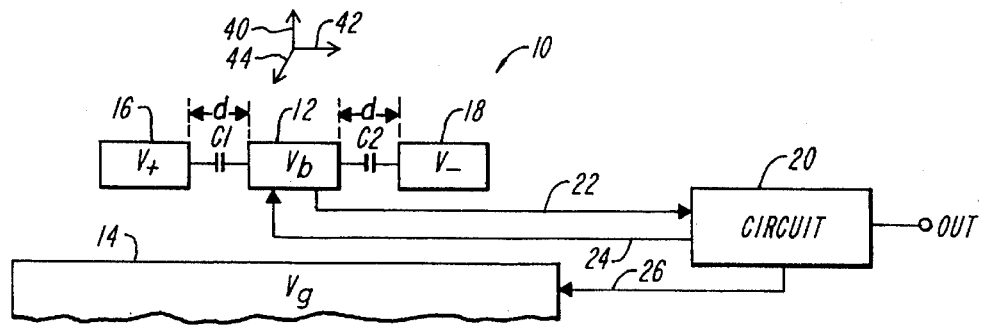
FIG. 1 is a cross-sectional view of a sensor according to the present invention.

Referring to the cross-sectional view of FIG. 1, a micromachined device 10 has a movable beam 12 that is suspended over a ground plane 14, and is movable in a lateral direction 42 relative to the ground plane. The ground plane is formed over a substrate (not shown). Beam 12 is centered between two fixed beams 16, 18 that are suspended in a vertical direction 40 over, and fixed relative to, ground plane 14. Movable beam 12, ground plane 14, and fixed beams 16, 18 have voltages of $V_b$, $V_g$, $V_+$, and $V_-$, respectively. Movable beam 12 and fixed beams 16, 18, which preferably are elongated along direction 44 and spaced close together, serve as plates that form capacitors C1 and C2. Capacitors C1 and C2 together form a differential capacitor. Directions 40, 42, and 44 are mutually orthogonal.

While device 10 is shown with one movable beam and two fixed beams, defined together as a "cell", such an accelerometer can (and typically does) have a plurality Of cells arranged in an interdigitated structure to form a number of differential capacitors. These capacitors are electrically connected in parallel to increase the total capacitance, thus enhancing the sensor's sensitivity.

Movable beam 12 and fixed beams 16, 18 are suspended approximately 1.6 microns over ground plane 14 with anchors (not shown). The combined width of the center beam and the beam gap is about 5 microns. The movable beam is preferably about 3.7 microns wide, and therefore is preferably spaced from each of the fixed beams 16, 18 with a beam gap d of about 1.3 microns. Due to process variations, however, the beam gap can vary among devices from about 1.1 to 1.5 microns, a range of about 37%.

In a sensor with closed loop circuitry, when movable beam 12 is moved with an acceleration, a circuit 20 senses a change in the capacitances of capacitors C1 and C2 over line 22. Circuit 20 then provides over line 24 to movable beam 12 a force feedback voltage that causes the movable beam to return to its central position. The force feedback voltage is also provided over line 26 to ground plane 14 to prevent the movable beam from moving vertically. In practice, a closed loop circuit actually provides an output signal that relates to the force that counteracts inertial force due to the acceleration, rather than the acceleration itself.

Fixed beams 16, 18 have fixed DC biases of $V_+$ and $V_-$; exemplary values are $V_+=3.4$ V, $V_-=0.2$ V, respectively. In a neutral state, $V_g=V_b=(V_++V_-)/2$.

If $V_b$ is held constant and $V_g$ is varied, there is a change (as expected) in a force along vertical direction 40 between the movable beam and the ground plane. However, it has been found that a change in ground plane voltage, $\Delta V_g$, also produces a change in force, $\Delta F$, on movable beam 12 along lateral direction 42. This $\Delta F$ pushes movable beam 12 toward the fixed beam having a higher fixed bias if $V_g>V_b$, or toward the fixed beam having a lower fixed bias if $V_g<V_b$.

For beam gap d=1.3 microns, it has been found that the force per unit cell (in $10^{-5}$ N/m unit) is $$F=0.61(V_+^2-V_-^2)-1.44(V_+-V_-)V_b+0.22(V_+-V_-)V_g. \quad \text{(Equation 1)}$$

Because $V_+$ and $V_-$ are fixed, this equation can be generalized as $F=K-K_bV_b+K_gV_g$, where K, $K_b$, and $K_g$ depend on the voltages on the fixed beams, the beam gap, and other geometry, and the change in the force resulting from a voltage change can be generalized as $\Delta F=-K_b\Delta V_b+K_g\Delta V_g$. Equation 1 further indicates that for a beam gap of 1.3 microns, $\Delta F$ produced by $\Delta V_g$ is about one-sixth of the $\Delta F$ produced by $\Delta V_b$; that the components of $\Delta F$ due to $\Delta V_g$ and $\Delta V_b$ are in opposite directions; and that the component of $\Delta F$ produced by $\Delta V_g$ is independent of the component of $\Delta F$ produced by $\Delta V_b$.

It has been found that while $K_b$ is very sensitive to the beam gap, $K_g$ is relatively insensitive to the beam gap: a difference of the beam gap from one device to another of 1.1 to 1.5 microns causes about a 7% difference in $K_g$, but about a 72% difference in $K_b$. For $\Delta V_g$, the error in measuring acceleration turns out to be even less than 7%. Because a difference in beam gap is mainly due to a difference in the width of the beam, an overestimation in the beam gap causes an overestimation in the mass of the beam. Because acceleration is F/m, the overestimations of the force and mass substantially offset each other, resulting in an overestimation of acceleration that may be less than about 1% (the amount can be different depending on the geometry of the beam). Thus, by providing $\Delta V_g$ while holding $V_b$ constant the sensor serves as a reliable voltage-to-acceleration converter.

To calibrate a sensor that has an open loop circuit, all that is needed is to provide a known voltage signal onto ground plane 14. The output response is measured, and calibration is performed accordingly. If the circuit gain is adjusted, it is preferably done by laser trimming a resistor, but can instead be done by programming an on-chip EPROM. If the circuit includes, or is coupled to, a processor, that processor can be programmed to perform the calibration by multiplying an output signal by a calibrating factor.

In an accelerometer with closed loop design, however, because ground plane 14 receives a feedback voltage through a feedback circuit, forcing a calibrating voltage signal on the ground plane of such an accelerometer can disturb the closed feedback loop. To perform calibration oil such devices, therefore, the feedback circuit is altered to allow for such a forced voltage without altering the feedback loop.

Figure 2:
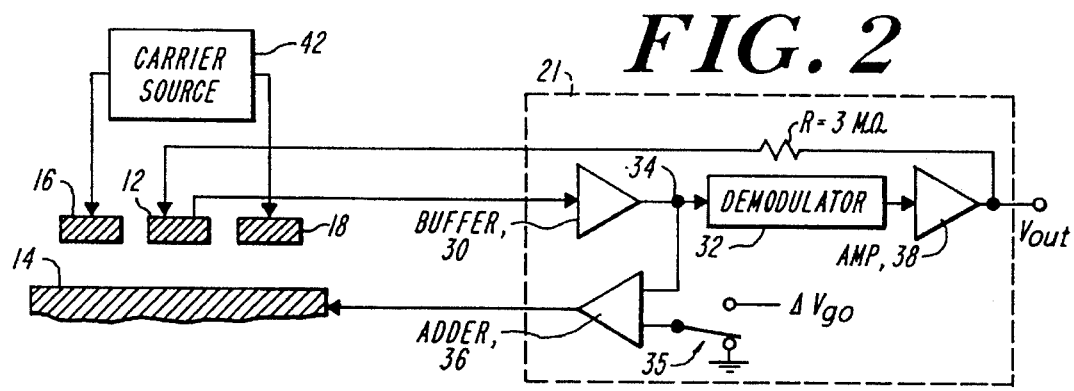
FIG. 2 is a schematic of a testing circuit according to the present invention.

Referring to the schematic of FIG. 2, one option for such a change is illustrated. As is currently done, a carrier source 42 provides 1 MHz square-wave signals of opposite phase to fixed beams 16, 18. In response to movement of movable beam 12, circuit 21, including buffer 30, demodulator 32, and amplifier 38, senses a change in the differential capacitor and provides an output signal $V_{out}$. This signal is fed back to movable beam 12 through a large feedback resistor.

According to the present invention, the buffered signal at node 34 (or possibly from some other node in circuit 21) is provided to the ground plane through a feedback loop. An adder 36 is provided in the feedback loop and has one input for receiving the buffered signal from node 34, and another input coupled to a switch 35 the input that switches from ground, during normal operation, to $\Delta\Delta V_{g0}$ during calibration. To calibrate, switch 35 is set to $\Delta V_{g0}$, and the circuit gain is adjusted so that the response $V_{out}$ has a desired value.

Even if no adder or other alteration is provided, the sensor can be calibrated with the circuit of FIG. 1 if the ground plane feedback is first disconnected then reconnected. When there is no external acceleration and the total force acting on the movable beam is zero, $$-K_b\Delta V_b+K_g\Delta V_g=0. \quad \text{(Equation 2)}$$

As noted above, $K_b$ is very sensitive to the beam gap, while $K_g$, which is much less sensitive to the beam gap, can be determined by simulation. The change in ground plane voltage required to produce an acceleration a on the center beam is $$\Delta V_{g0}=ma/K_g. \quad \text{(Equation 3)}$$

Thus, $\Delta V_{g0}$ is provided to the ground plane, and as a result of a loop response, the movable beam voltage is changed by $\Delta V_{b0}$ and therefore $$K_b=K_g\Delta V_{g0}/\Delta V_{b0}. \quad \text{(Equation 4)}$$

Under normal operating conditions with the ground plane feedback connected, the force produced by $\Delta V_{b0}$ fed back to the movable beam is $$F=K_b\Delta V_{b0}-K_g\Delta V_{b0}=K_g(\Delta V_{g0}-\Delta V_{b0}) \quad \text{(Equation 5)}$$

This corresponds to an acceleration, in normal operation condition, of $$a'=K_g(\Delta V_{g0}-\Delta V_{b0})/m=a\{1-(\Delta V_{b0}/\Delta V_{g0})\}. \quad \text{(Equation 6)}$$

To use this information for calibration, a calibrating difference voltage signal $\Delta V_{g0}$ is applied on the ground plane, and a movable beam voltage response $\Delta V_{b0}$ is measured. The resistor in the circuitry is trimmed with a laser so that the output response corresponds to an acceleration $$a'=\Delta V_{g0}(K_g/m)\{1-(\Delta V_{b0}/\Delta V_{g0})\}. \qquad \text{(Equation 7)}$$

This is a known value, because $\Delta V_{g0}$, $\Delta V_{b0}$, and $K_g/m$ are known. The signal $\Delta V_{g0}$ can be a DC signal or an AC signal, such as a sinusoid or square wave.

In any of the open or closed loop circuits noted above, either an internal reference or an external source can be used to provide voltage $\Delta V_{g0}$ to the ground plane. By using an internal reference, probing error is minimized.

Figure 3:
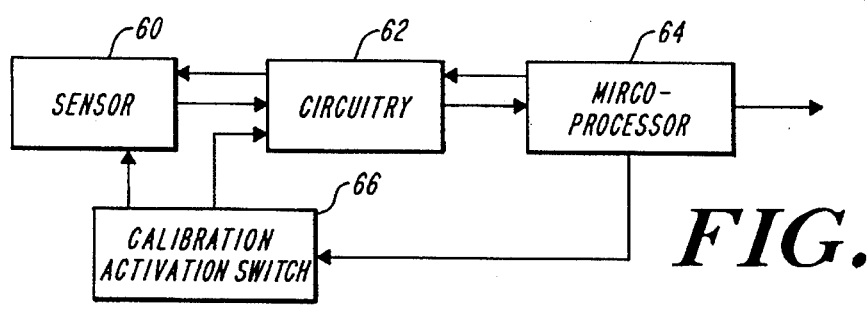
FIG. 3 is a schematic of a circuit with self-calibration.

Furthermore, if an internal reference is used, an internal switch controlled by a logic gate can be used to activate the voltage on the ground plane. Referring to FIG. 3, this internal reference allows a sensor 60 to self-calibrate. In this embodiment, circuitry 62 senses a change in capacitance from sensor 60 and provides an output signal to a microprocessor 64, which, in turn, may provide an output signal, such as a signal to an air bag switch.

A calibration activation switch 66, which may include logic circuitry, causing a calibration routine to be commenced automatically in response to the triggering event. In an automobile, for example, the event could be power-up whenever the ignition is started. The triggering event could instead be based on a timer, in which case the sensor is self-calibrated every certain period of time.

Switch 66 causes a $\Delta V_g$ to be provided to the ground plane so that circuitry 62 provides a response. The microprocessor receives this response and determines whether to multiply it by an adjustment factor. This self-calibration also serves as a self-test of the device to make sure that the sensor is working.

Self-calibration addresses several different factors that can cause changes in the sensitivity of the sensor, such as the temperature coefficient of the sensor, the temperature coefficient of a die attach material, die attach stress, and changes in the mechanical properties of the movable beam over a long period of time.

With a properly programmed microprocessor as shown in FIG. 3, not only self-calibration, but also an initial calibration can be performed without having to trim a resistor or program an EPROM.

Figure 4:
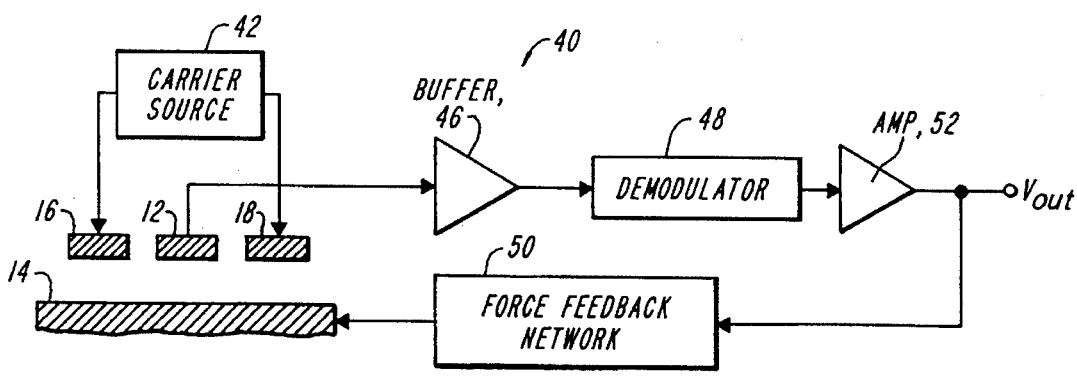
FIG. 4 is a schematic of a force feedback circuit according to the present invention.

Referring to FIG. 4, in addition to providing a force for calibration, because $\Delta F$ produced by $\Delta V_g$ is predictable, this information can also be used for force feedback actuation to return the movable beam to its central position between the fixed beams after some external acceleration moves it.

As in FIG. 2, when movable beam 12 is displaced an output signal $V_{out}$ is produced. Signal $V_{out}$ may be provided to force feedback network 50 to feed signal $V_{out}$ back to ground plane 14. With appropriate feedback circuitry, this signal on the ground plane produces a lateral force that returns the movable beam to its central position after being moved by an acceleration.

Having described embodiments of the present invention, it should be apparent that modifications can be made without departing from the scope of the invention as defined by the appended claims. The terms "vertical" and "lateral" are used for reference, but the "lateral" direction could be vertical in some other arrangements of the beam. Perturbation, to the field around the beams, other than through the ground plane, can be employed to cause a force on a movable beam. Thus, a force reference for calibration may be produced with electrodes other than the ground plane. Such a force reference should be insensitive to process variations, such as beam gap.

What is claimed is:

1. A method for calibrating a sensor having a ground plane, a fixed beam fixed relative to the ground plane, a movable beam suspended over and movable relative to the ground plane in a lateral direction, and circuitry for sensing movement of the movable beam relative to the fixed beam in the lateral direction and for providing an output signal, the method comprising:

providing a voltage to the ground plane to cause the movable beam to move in the lateral direction with an expected acceleration;

receiving an output signal indicating a measured acceleration of the movable beam in the lateral direction; and adjusting the circuitry so that the output signal indicates that the measured acceleration is substantially the same as the expected acceleration.

2. The method of claim 1, wherein the output signal is fed back to the ground plane.

3. The method of claim 1, wherein the voltage provided is a sinusoidal voltage.

4. The method of claim 1, wherein the adjusting step includes trimming a resistor.

5. The method of claim 1, wherein the adjusting step includes programming a programmable device integrated with the sensor.

6. The method of claim 1, wherein the providing step is in response to receiving an-indication of a self-calibration event.

7. The method of claim 6, wherein the event includes power-up.

8. A sensor comprising:

a ground plane;

a first fixed beam fixed over the ground plane;

a movable beam suspended over and movable relative to the first fixed beam and ground plane in a first direction that is parallel to the ground plane; and calibration circuitry including:

a voltage source for providing a voltage to the ground plane to cause the movable beam to move in the first direction with an expected acceleration, and means for providing an output signal indicating a measured acceleration of the movable beam in the first direction, the circuitry being adjustable so that the measured acceleration is substantially the same as the expected acceleration.

9. The sensor of claim 8, further including a second fixed beam, wherein the movable beam is between the first and second fixed beams.

10. The sensor of claim 8, wherein the circuitry includes feedback circuitry coupling the output signal and the ground plane, the means for providing a test voltage including means for providing the test voltage without altering the feedback loop.

11. The sensor of claim 8, wherein the circuitry includes means for automatically self-calibrating in response to a triggering event.

12. The sensor of claim 11, wherein the self-calibrating means includes means for sensing a power-up state.

13. The sensor of claim 11, wherein the self-calibrating means includes means for sensing an elapsed time.

14. The sensor of claim 11, wherein the self-calibrating means includes a microprocessor which alters output signals during normal operation in response to the calibration performed by the self-calibration means.

15. A sensor comprising:

a conductive ground plane lying in a first plane;

a first fixed beam suspended over and fixed relative to the ground plane;

a second fixed beam suspended over and fixed relative to the ground plane;

a movable beam suspended over and movable relative to the first and second fixed beams and the ground plane in a first direction in a second plane parallel to the ground plane, wherein the first and second fixed beams and the movable beam lie in the second plane; and calibration circuitry including:

a voltage source for providing a known voltage to the ground plane to cause the movable beam to move in the first direction with an expected acceleration, and output circuitry for providing an output signal indicating a measured acceleration of the movable beam in the first direction, the circuitry being adjustable so that the measured acceleration can be made to be substantially the same as the expected acceleration to calibrate the sensor.

16. The sensor of claim 15, wherein the output circuitry includes a closed loop system that includes feedback circuitry for providing the output signal to the ground plane, the voltage source being coupled to the ground plane to provide the known voltage without altering signals provided over the feedback circuitry.

17. The sensor of claim 15, wherein the calibration circuitry includes means for automatically self-calibrating in response to a triggering event.

18. The sensor of claim 15, further including a substrate and a dielectric layer over the substrate, wherein the conductive ground plane is formed over the dielectric layer.

19. The sensor of claim 15, wherein the output circuitry includes an open loop circuit providing an output signal without feedback to the movable beam.

* * * * *